(12) United States Patent
Deane et al.

(10) Patent No.: US 6,843,110 B2
(45) Date of Patent: Jan. 18, 2005

(54) METHOD AND APPARATUS FOR VALIDATING THE ACCURACY OF A FLOWMETER

(75) Inventors: Jeffrey P. Deane, Carlsbad, CA (US); Malcolm M. McQueen, Encinitas, CA (US)

(73) Assignee: Fluid Components International LLC, San Marcos, CA (US)

( * ) Notice: Subject to any disclaimer, the term of this patent is extended or adjusted under 35 U.S.C. 154(b) by 401 days.

(21) Appl. No.: 10/179,630

(22) Filed: Jun. 25, 2002

(65) Prior Publication Data

US 2003/0233860 A1 Dec. 25, 2003

(51) Int. Cl.[7] ............................................. G01M 19/00
(52) U.S. Cl. ...................................................... 73/116
(58) Field of Search .......................... 73/116, 1.34, 1.35

(56) References Cited

U.S. PATENT DOCUMENTS

| | | | | |
|---|---|---|---|---|
| 4,389,886 A | * | 6/1983 | Korczak | 73/168 |
| 4,509,373 A | * | 4/1985 | Brown | 73/861.28 |
| 5,359,878 A | * | 11/1994 | Mudd | 73/1.16 |
| 6,305,232 B1 | * | 10/2001 | Ohle et al. | 73/861.22 |

OTHER PUBLICATIONS

Primayer–ABB Channel Partnership, CalMaster—In–situ Calibration Verification, Internet web page (1 page), no date.
Kurz et al., Variable Correction Factor ("VCF") In–Situ Calibration Procedure, Internet web page (2 pages), no date.
Panametrics, Inc., Digitalflow™ GF868 Mass Flowmeter trade literature (4 pages) (Dec. 2000).

* cited by examiner

*Primary Examiner*—Robert Raevis
(74) *Attorney, Agent, or Firm*—The Maxham Firm

(57) ABSTRACT

A method and apparatus for testing sensors in a fluid flow conduit to verify the accuracy of the flowmeter of which the sensors are a part. Where two similar sensors are employed, active and reference sensor functions are interchanged to verify their functioning accuracy. Alternatively, different stimulation levels can be used to provide a basis for cross-correlation of sensor outputs. A single, or multiple, time-shared sensor can be employed in place of two sensors. Transient or steady state responses are employed. Many sensor types can be used.

93 Claims, 5 Drawing Sheets

METHOD AND APPARATUS FOR VALIDATING THE ACCURACY OF A FLOWMETER

BACKGROUND OF THE INVENTION

1. Field of the Invention

This invention relates generally to flowmeters and, more particularly, to a method and apparatus for validating the accuracy of a flowmeter in situ.

2. Discussion of the Related Art

There are many types of flowmeters which are employed to measure a variety of flowing fluids through conduits of a myriad of sizes and shapes. Depending on the particular situation, accuracy of the outputs of a flowmeter may range from useful, to important, to extremely critical. The accuracy of such a meter is ultimately dependent upon the proper functioning of the sensors or other signal-producing elements which have an active relationship with the flowing fluid.

In order to be confident that a flowmeter is functioning properly and providing accurate information, the sensors must be tested for proper operation on a periodic basis. Where accuracy is extremely critical, validation of sensor functioning will typically be more frequent than where the flowmeter provides useful, but not normally critical, flow information.

Routine verification of flowmeter calibration and the traceability of information are key to current auditing and regulatory requirements. In the past, this has proved difficult, time consuming, and costly. For example, in the water industry, the task could entail mechanical excavation and removal of the flowmeter resulting in disruptions of the water supply to the local community.

There are generally two known methods to verify the calibration of flowmeters. One is to remove the flowmeter from the process or installation and send it to a qualified laboratory for verification. The other method is to install or connect by means of a bypass, on a temporary basis, a known reference flow measurement standard in series with the meter being tested. This is an in-situ verification.

Both of the above methods are referred to as "wet," or complete sensor-to-output, checks of the meter being tested.

In some installations it may only be necessary to check a selected portion of the sensor-to-output signal path. For example, the transmitter electronics of a thermal dispersion flowmeter could be checked by employing precision decade resistance boxes as a substitute for the thermal flow element, and adjusting the decade resistance boxes to verify the differential-resistance-input-to-current or other output relationship of the sensor or flow element portion of the transmitter. This method is relatively incomplete and is generally less desirable because it only synthesizes the flow element input.

Similarly, an artificial differential pressure could be introduced to, for example: a venturi meter, a pitot tube array, or an orifice based meter flow element to determine that the output corresponds correctly to the synthesized input signal pressure difference.

This partial approach is known as a "dry" calibration. Although dry calibration checks are typically less accurate and less complete than wet calibration checks, in many instances dry checks are tolerated because they are more convenient and less expensive than wet checks. Their great disadvantage is they do not check the validity of the flow element input signal and rely, as illustrated above, on a synthetic input.

Wet calibration procedures as described above are expensive, inconvenient, time consuming, and require skilled operators in order to produce good results. In general, dry checks, as have been previously known, are less accurate and may not be an available option for every flowmeter. Their greatest drawback is they fail to check the most vulnerable element in the system, the primary element in the flow stream, which is the sensor or flow element.

SUMMARY OF THE INVENTION

The present invention, in its various embodiments, provides an apparatus and a method to validate the accuracy or calibration of a flowmeter without the need to remove part or all of the meter from the process and without the need to attach a reference standard or other external device to some aspect of the meter. It is believed that regulatory agencies would be more accepting of the proposed method of this invention than they would be to any "dry" test under most circumstances.

In a thermal dispersion flowmeter employing heated sensor technology, in one embodiment employing a heated sensor and an unheated reference sensor, the sensor functions are switched and readings are taken and compared with calibration data in memory. As an alternative embodiment, this technique can also be employed where a single sensor performs both the heated sensor and reference sensor functions on a time-shared basis. Steady state temperature differences or alternatively transient temperature effects can be employed for these purposes.

Other embodiments enable the sensor functions to be checked by employing different excitation or stimulation levels, and comparing the results with data in memory, rather than switching the functions of the sensors. This would be most applicable where the two sensors are electrically different and are bridged together and cannot be interchanged easily. Frequently these heated sensor devices employ a third temperature sensor that could be similarly employed to attain the desired goal by using it in conjunction with the bridged sensors at a different power level, for example.

There are several different types of temperature-based sensors used in flowmeters. Among these are resistance temperature detectors (RTDs), thermocouples, thermopiles, semiconductor junctions, thermistors, transistors, and diodes. Flow rate measurement methods other than those that are thermally based include sonic (including ultrasonic), vortex, magnetic, differential pressure, coriolis, positive displacement, and rotary vane (turbine). All of the embodiments disclosed, and their equivalents, function in accordance with the principles of this invention, and provide correct, convenient, and rapid accuracy verification and validation for flowmeters.

BRIEF DESCRIPTION OF THE DRAWING

The objects, advantages and features of the invention will be more clearly perceived from the following detailed description, when read in conjunction with the accompanying drawing, wherein:

FIGS. 9A and 9B are schematic representations of a vortex sensor-based flowmeter, with the vortex-inducing strut being shown end-on.

DETAILED DESCRIPTION OF THE PREFERRED EMBODIMENTS

Figure 1:
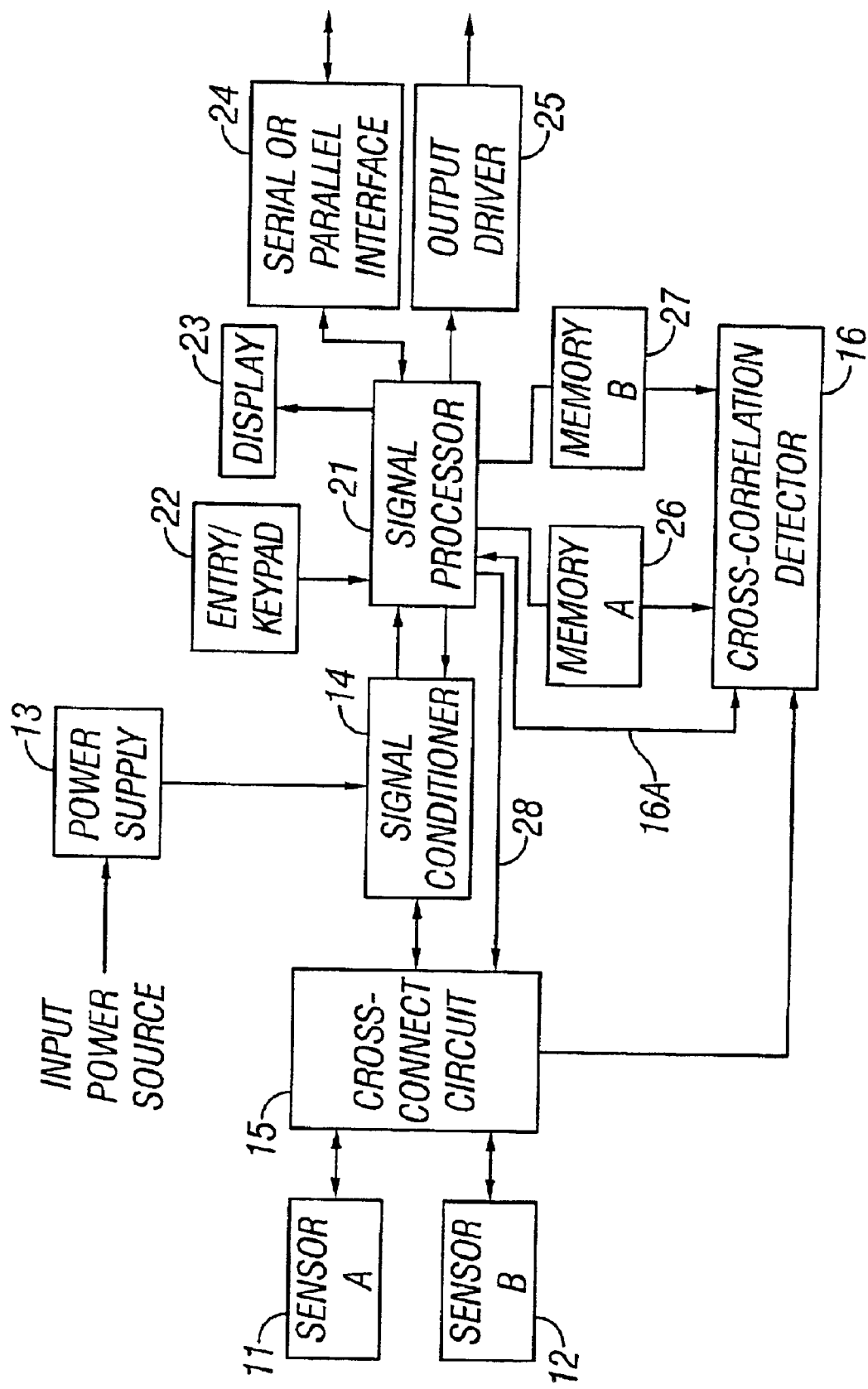
FIG. 1 is a block diagram of one embodiment of a flowmeter of the invention.

This invention provides correct and rapid verification of the accuracy of a flowmeter in situ. In its various embodiments the invention enables switching, the application of different stimulation levels, or time-shared operation of a sensor or sensors, or a combination thereof, to provide the desired testing. The invention does not require disassembly, nor does it require additional devices to be temporarily coupled to the flowmeter to accomplish tests for verification.

With reference now to the drawing, and more particularly to FIGS. 1, 3, 5 and 6, particular embodiments of the invention will now be discussed.

The block diagram of FIG. 1 shows an embodiment of the system according to the invention. For purposes of explanation, it will be assumed that Sensor A (11) and Sensor B (12) are thermal devices such as resistance temperature detectors (RTDs). As is well known, RTDs are frequently installed in pairs where one is heated and is the active sensor, while the other is a relatively or substantially unheated reference sensor. Fluid flow past the sensors in a conduit causes heat dissipation from the active sensor. A change in differential temperature is reflected as a change in differential resistance. This steady state $\Delta T$ or $\Delta R$ is indicative of the instantaneous mass flow rate of the fluid or media in the conduit. Alternatively, some flowmeters maintain a constant $\Delta T$ and measure the variable power required to hold the $\Delta T$ constant as the flow rate indicator.

With constant power applied, a $\Delta T$ or $\Delta R$ between the active sensor and the reference sensor determines the mass flow rate from that information. Of course, the type of fluid and its characteristics are known and are involved in the calculation. Alternatively, as another way to determine fluid flow by means of the flowmeter, temperature (resistance) differential can be held constant and the steady state change in power determines mass flow rate. Further, $\Delta T$ or $\Delta R$ can be varied as a function of flow rate by substituting constant power, constant current or constant voltage. There are secondary effects, principally pressure and temperature, that may need to be accounted for so that service conditions are correctly reflected. Other such service conditions could include turbulence in the flowing media, high intensity sound, and mechanical vibrations.

Power supply 13 powers the flowmeter. Signal conditioner 14 develops power levels and signal formats that may be required for other elements in the meter. Cross-connect circuit 15 provides switching for sensors 11 and 12. The signal outputs from the sensors are fed back through the cross-connect circuit to the signal conditioner and to cross-correlation detector 16. Signal processor 21 determines the mass flow rate based on the outputs from the sensors.

The power supply can provide any appropriate power level and format to the flowmeter, as determined by the signal conditioner. Typically it will supply a variable 20–42 volts dc (VDC) to power and heat the sensors, and a regulated 5 VDC for the digital logic. The 5 VDC is a current standard, but the power to the flowmeter components could be different as desired. The power supply may itself be powered by an incoming source of 115 or 230 volts ac (VAC), or 24 VDC.

In one embodiment, signal conditioner 14 is configured to convert 20–42 VDC to a constant current of 0.5 mA to energize the reference sensor and 20 mA to heat the active one of sensors 11 and 12. The signal conditioner also provides the 5 VDC for the rest of the flowmeter functions. The signal conditioner senses the voltages across RTD sensors 11 and 12 to determine the voltage difference ($\Delta V$). The $\Delta V$ results from a resistance change ($\Delta R$) at constant current, which is proportional to $\Delta T$, providing a basis for calculating the mass flow rate of the media involved. The heating current of 20 mA is an example only and any stimulation which produces the desired result can be used.

In an alternative embodiment, signal conditioner 14 can operate with respect to the sensors as a constant power source, where the current to and voltage across the sensors can vary. The signal conditioner includes a multiplier circuit which monitors the power ($V \times I$) for each sensor and holds that power constant. The change in either current to or voltage across the active sensor is related to resistance change (and hence, temperature change) and is therefore used to calculate the mass flow rate of the media.

Still another commonly employed scheme is to hold the differential temperature of the two RTDs constant. According to this scheme the power is varied as a function of the flow rate, that is, as the flow rate increases, additional power must be applied to the heated sensor in order to hold the temperature constant.

In the above case the signal conditioner maintains a constant $\Delta T$. Since the resistance and temperature relationship for an RTD is fixed, $\Delta R$ is also constant. To maintain $\Delta T$ or $\Delta R$ constant, both $\Delta V$ and $\Delta I$, or $\Delta$ power, can be monitored to provide a basis for calculating mass flow rate at any particular process temperature as a function of the power needed to hold a constant temperature difference. These devices often employ a third element with a fixed current or voltage in order to sense the process temperature. The $\Delta T$ at any excitation will also vary with process temperature so it becomes necessary to compensate for this effect. This function is also carried out by the signal processor as discussed below.

As yet another alternative, voltage can be maintained constant, which is the converse of the constant current scheme described above. When $\Delta V$ is maintained constant, the current changes with temperature changes. The $\Delta I$ provides the basis for determining mass flow rate in this embodiment.

The above described methods for determining mass flow rate of flowing fluid are well known to those of ordinary skill in the field of heated sensor technology. In application, there are other means to contend with system service variables other than flow rate, including pressure and temperature, as has been discussed above.

Whether sensors 11 and 12 are operated as constant current, constant power, constant differential temperature, or constant voltage, it is possible to reverse the sensor roles to supply the heating stimulation to what had been the reference sensor and to supply the lower, non-heating stimulation to what had been the active sensor.

When these operating schemes employ a third sensor, it is still possible to change the roles of the three sensors.

Signal processor 21 could be a microprocessor, a hard wired state machine, a digital signal processor, or equivalent. The function of the signal processor is to calculate the mass flow rate of the media from the sensor outputs, whether they be a measure of $\Delta T$, $\Delta I$, $\Delta V$, or other measures that can be employed. Instructions for operation of the flowmeter can be applied to the signal processor by entry device or keypad 22. A local output from the flowmeter may be shown on display 23. Additional outputs are provided to serial or parallel interface 24, which can drive external operations such as controls for the meter or for modifying the monitored process. Output driver 25 may be employed to drive external indicators, such as displays, or optical or audible alarms, for example.

In normal operation, the flowmeter of FIG. 1 energizes the sensors while fluid is flowing past them. If sensor 11 is the active sensor, constant current will be applied in the preferred method to heat it to a predetermined temperature and a much smaller constant current will be applied to energize or enable sensor 12, but without increasing its temperature to any appreciable extent. Alternatively, rather than a variable temperature for sensor 11, a predetermined temperature differential $\Delta T$ (or resistance differential $\Delta R$) is achieved between the sensors. In typical operation, when there is fluid flow past the sensors, heat will be dissipated from active sensor 11 and the temperature differential will decrease. The $\Delta T$ at any time is interpreted by signal processor 21 as a particular mass flow rate of the fluid or media moving past the sensors, and the flowmeter provides the appropriate outputs. When $\Delta T$ decreases the flowmeter shows an increase in mass flow rate because heat is more readily dissipated by the media from the heated active sensor than the relatively unheated reference sensor.

Figure 4:
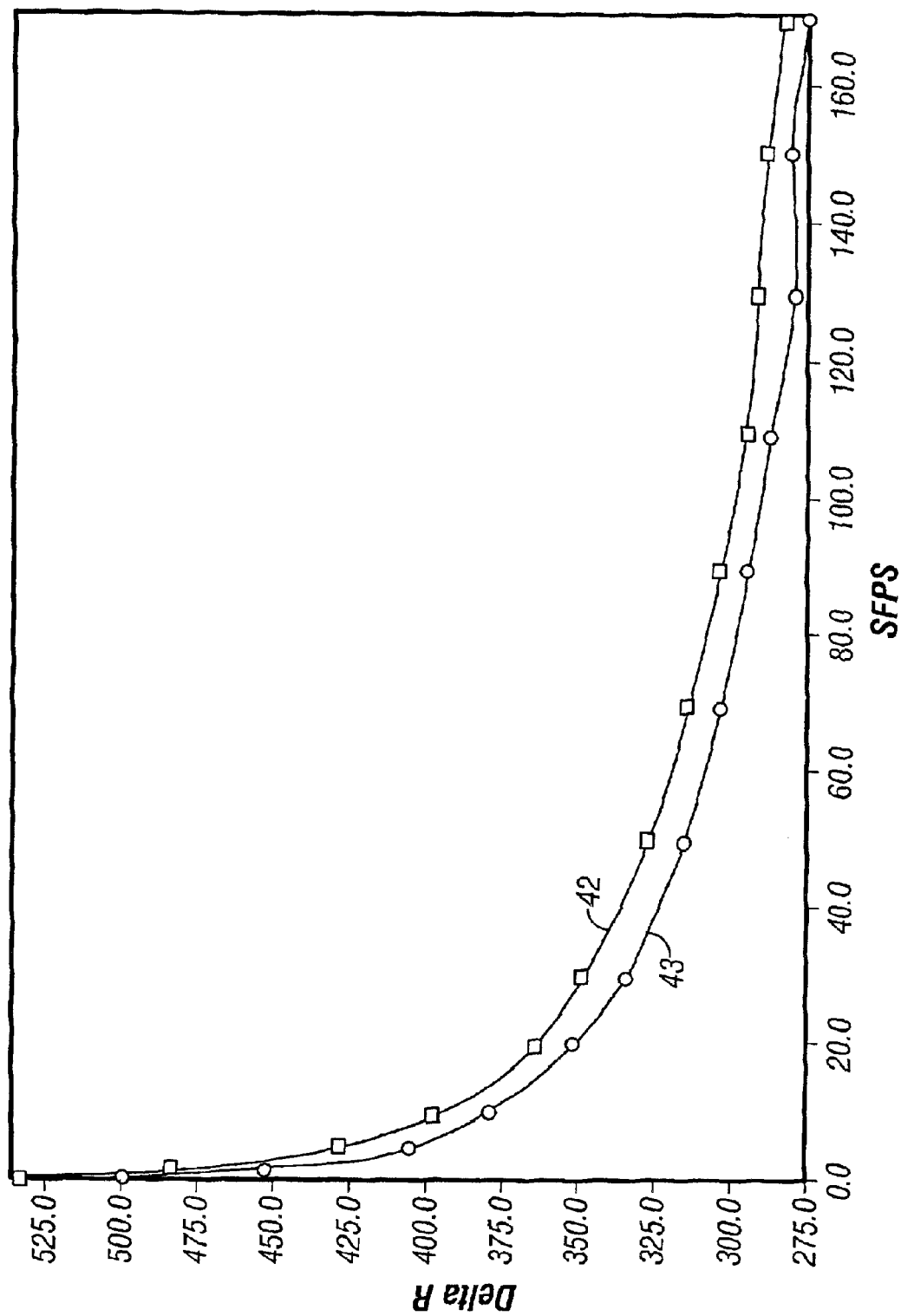
FIG. 4 is a graph showing an example of resistance change against fluid mass flow rate for the FIGS. 1 and 2 systems.

The calibration characteristics of sensors 11 and 12 are developed and stored in Memory A 26 and Memory B 27. Exemplary calibration curves are shown in FIG. 4. Assuming the sensors are very similar but not identical, curve 42 represents the calibration data for sensor 11 and curve 43 represents the calibration data for sensor 12. Memories 26 and 27 may be separate elements, a single device, or they may be included within signal processor 21.

In order to check the functioning accuracy of the flowmeter of this embodiment, cross-connect circuit or switch 15 is provided between sensors 11 and 12 and signal conditioner 14. Switch 15 may be any suitable device which electronically or mechanically, or both, provides interchanging or switching functions. Pursuant to a signal from entry device 22, signal processor 21 sends a signal over line 28 to cross-connect circuit 15 to reverse the functions of sensors 11 and 12. Thus, sensor 12 becomes the active or heated sensor and sensor 11 becomes the reference sensor. The flowmeter then functions as before and provides as an output the mass flow rate of the media being monitored. With the sensed flow rate at a steady state condition, if the output mass flow rate indication is substantially the same, independent of which is the active sensor, the accuracy of the flowmeter is validated. If there is more than an insignificant difference, remedial action is imperative. What constitutes a significant difference is ultimately determined by the flowmeter operator. One measure for a significant difference is the standard for the instrument. That standard could be a 3% difference, or a 10% difference, for example. A signal may result when the established standard is exceeded, but the operator may choose to allow the process to continue, and await a further test reading to see if the detected difference increases, signalling that corrective action should be taken, or the situation abates.

When a signal from entry device 22 instructs signal processor 21 to interchange sensor functions, a signal first goes to cross-correlation detector 16 to record the mass flow rate output with the sensors in their initial operating conditions. This refers to the calibration data in memories 26 and 27. For example, with sensor 11 heated and a $\Delta R$ of about 350, the mass flow rate, according to curve 42, is about 30 standard feet per second (SFPS).

The functions of the sensors are then switched and curve 43 represents the calibration data for sensor 12 as the active sensor. Under the same flow conditions, $\Delta R$ in this case is about 335, which results in the same mass flow rate of about 30 SFPS.

Under typical operating conditions there will be a delay of 20–40 seconds (typically about 30 seconds) between readings in order to permit heated sensor 11 to cool down and sensor 12 to be heated to operating temperature, whether employing constant current, power, voltage or temperature. The preferred method is to conduct the validation process when the flow rate is stable and constant after sensor thermal equilibrium has taken place. If desired, the accuracy validation could be conducted at several different stable flow rates and process temperatures.

When there are significant differences in flow rate output, or if it is suspected that there may have been other than inconsequential media flow variations in the few seconds between readings after the sensor functions are switched, return switching or repeated switching may be employed to be sure that a sensor is out of tolerance and should be removed from service.

The signal to perform the accuracy verification operation may be on a timed basis as programmed into signal processor 21, such as once during each 24-hour period, or it may be pursuant to an operator-initiated input on keypad 22, for example. Alternatively, the signal to perform an accuracy check of the flowmeter could be applied from a remote location through serial or parallel interface 24, either pursuant to operator initiation or a timed function.

In a typical installation, a flue gas stack for example (FIGS. 3, 5 and 6), sensors 11 and 12 are mounted in a mast 31 which is mounted in stack 32. Mast 31 is typically inserted through an opening in the side of the stack and extends across the stack. It may be cantilevered, or anchored to the opposite side of the stack as shown. The diameter of the stack may be as little as two feet and as large as 30 feet. The sensors may be mounted to bracket 33 (FIG. 3) which is formed with depressed platform 34 from which sensors 11 and 12 extend in the form of thermowells. Typical dimensions for the thermowells are 0.08 inches in diameter and 0.63 inches in length. In this particular exemplary arrangement, mast 31 is about two inches in diameter. Electrical wires 35 and 36 extend from the sensing elements 11a, 12a within the respective thermowells through bore 37 in bracket 33 and along central bore 41 in mast 31 to the electronics in housing 42 at the end of mast 31. The housing typically extends outwardly from stack 32. While media flow would normally and preferably be across the thermowells (into or out of the plane of the paper in FIG. 3), the sensors can function if they are at any angle to the direction of media flow. Thus, there is a flexibility of 360° of flow direction relationship with respect to the thermowells. That is, flow direction may be into the paper or out of the paper in FIG. 3, or any direction in between where the media affects the thermowells, including from the top toward the bottom of the paper and vice versa (axially of the thermowells). It has been found that even when the thermowells are pointing directly downstream of the direction of media flow, useful flow rate readings can be obtained. It is only necessary to calibrate the sensor elements at the selected angle, anywhere through the entire 360°. In the preferred positions the sensor axis would be across the flow direction or alternatively arranged for the flow to be in the direction of the axis of the thermowells wherein the support structure (mast 31) would function as a rain shield. It may be desirable in some circumstances to point the axes of the sensors downstream so that the mast can act as a shield to reduce the effects of erosion.

As shown, there could be two or more sets of sensors on a single mast and there may be two or more masts mounted in close proximity in the stack. Two masts are shown at 90°, but they could be at any desired angle with respect to each other and one, two, or more such masts could be employed. They could be at different positions along the height of the stack. A similar installation may be employed in any fluid flow duct or conduit and the diameter or inside dimension may be less than two feet or greater than 30 feet. The duct may be square, oblong, or any other shape when viewed in cross section.

While thermowells are shown, the sensors are not necessarily mounted in thermowells. In some instances it may be desirable to mount the temperature (or other type) sensors on a flat surface, with or without fin-like projections exposed to the flowing media.

Figure 2:
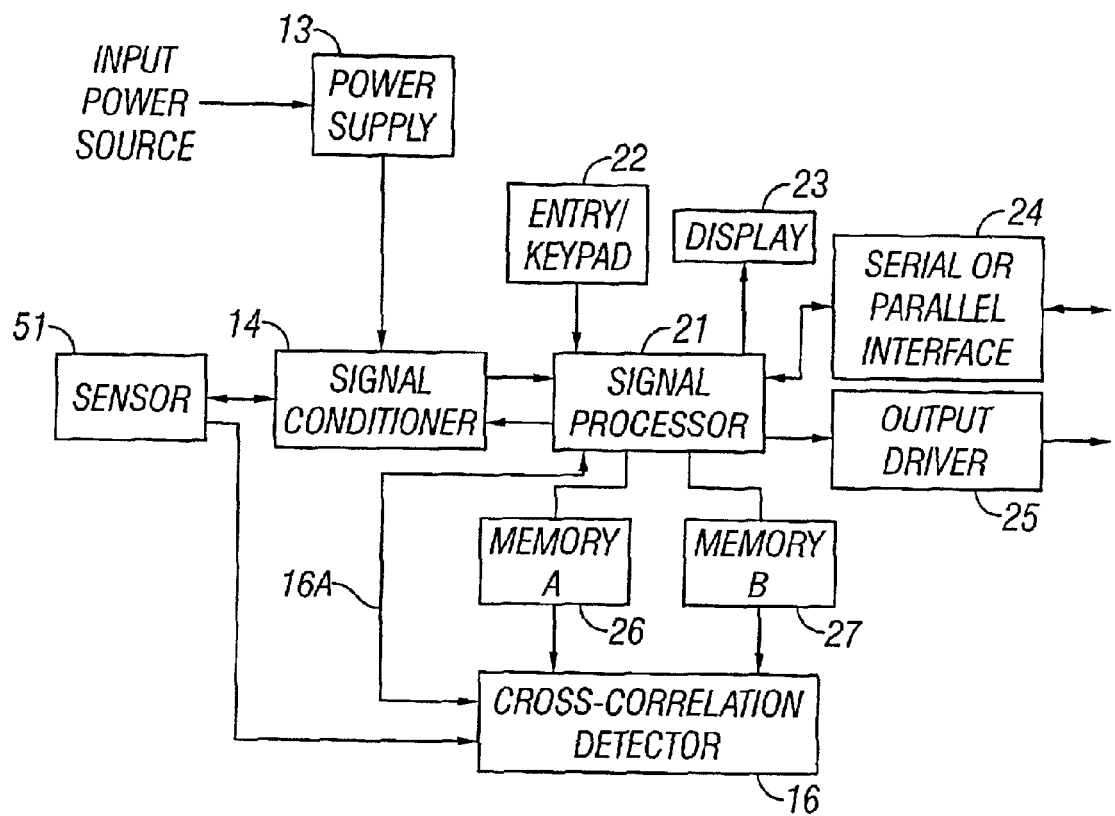
FIG. 2 is a block diagram of an alternative embodiment of the present invention.
Figure 3:
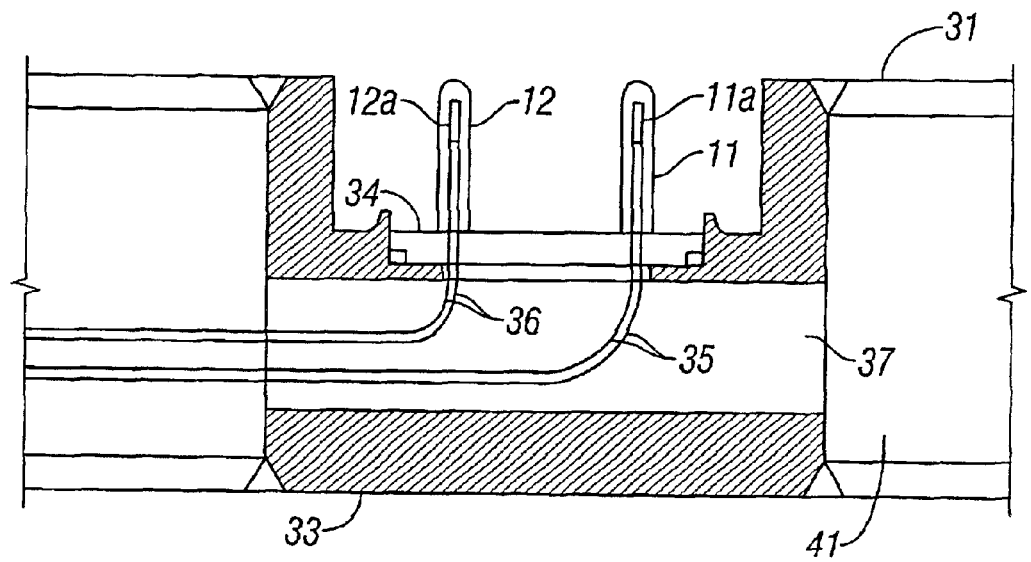
FIG. 3 is an enlarged lateral view of an exemplary sensor installation in a conduit, in accordance with the invention.

The flowmeter of FIG. 2 functions similarly to that of FIG. 1, except that it employs a single sensor. Sensor 51 is operated in a time-shared fashion, where it is the heated sensor for a predetermined short period of time and is the substantially unheated, or reference sensor for a predetermined short period of time. In this embodiment, instead of switching sensor functions, signal conditioner 14 and signal processor 21 apply different stimulations or different levels of stimulation to sensor 51. The characteristic data for this sensor at two different conditions or stimulation levels are stored in memories 26 and 27, and could have the same form as curves 42 and 43 of FIG. 4.

In normal operation, sensor 51 is at first energized but substantially unheated and its resistance is noted by signal processor 21. Then it is heated by a first stimulation or current, for example, 15 mA, and the measured $\Delta R$ enables the flowmeter to provide a mass flow rate output. Cross-correlation detector 16 stores the output with reference to the calibration data in Memory A 26. The stimulation is removed and after a period of time sufficient to allow the temperature of the sensor to return to ambient (20–40 seconds, for example), another reference reading is taken. Then a second, different, level of stimulation, for example, 20 mA, is applied to sensor 51 and pursuant to the curve in Memory B 27, the mass flow rate is once again determined. If the readings of mass flow rate are substantially identical as determined by the cross-correlation detector, it is ascertained that sensor 51 is functioning normally. The more such readings are taken, the greater the level of confidence that the flow rate calibration is validated. In fact, an entire flow rate curve from low flow rate, even zero, could be checked for validation at any and all flow rates. It is preferred that the flow rate and media temperature be constant at any of the verification flow rates.

As an alternative validation method, it is possible to employ two sensors, as in FIG. 1, and not switch their functions while verifying the accuracy of the flowmeter. Assuming sensor 11 is the active sensor, it may be heated by a first level of stimulation, for example, 15 mA. The calibration characteristics of sensor 11 at 15 mA stimulation may be stored in Memory A 26. Sensor 12 would be energized but not stimulated for increased temperature. Then by other means it can be determined that the flow rate is constant and sensor 11 is heated by a second level of stimulation, such as 20 mA. The response characteristics of sensor 11 at 20 mA stimulation may be stored in Memory B 27. Cross-correlation detector 16 functions as previously described and determines whether the outputs of sensor 11 at the two different levels of stimulation are within tolerance so that the flowmeter provides an accurate "wet" mass flow rate output. This method requires less time for the heated sensor to attain a higher temperature than the reversing of sensor functions. The shorter time interval contributes to the likelihood that the flow rate and other factors have remained constant during the validation process. For best and most accurate results with a single test, all such validations should occur in a short time interval when the process conditions are either known, or are constant or nearly constant.

The exemplary description above has generally assumed that the flow sensors are heat-differential-based, a primary example being RTDs. Other thermally-based sensors could be used in place of the RTDs described initially. These alternatives include thermocouples, thermopiles, semiconductor junctions, thermistors, transistors, and diodes, among others. Several other types of sensors could be used in a similar manner in a flowmeter. Additionally, in the above embodiments, where there are two sensor elements which are functionally interchanged, the sensor elements have been preferably substantially identical. However, that is not a requirement. In keeping with the FIG. 1 embodiment, the operating characteristics of two sensors having different characteristics can be stored in memory and calibrated to provide equivalent flow rate readings, no matter which is the stimulated and which is the reference sensor. Further, the principles of the invention as taught herein can be effected if one sensor or the other is stimulated at a second level.

Figure 7:
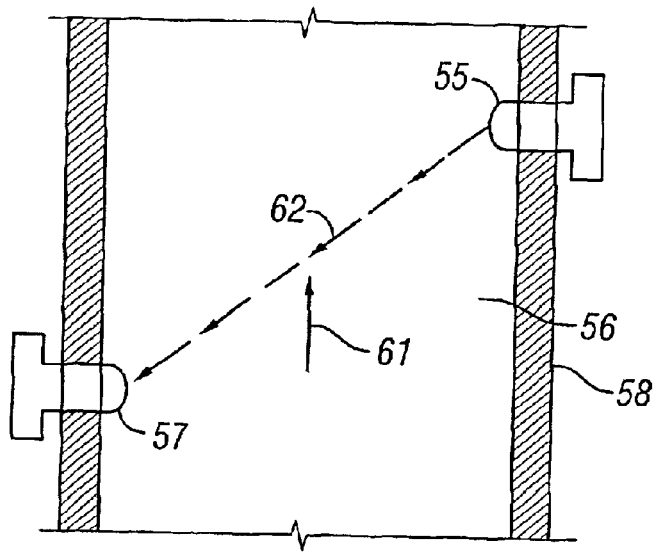
FIG. 7 is an elevational view showing a sonic-based sensor system.

A Doppler sonic system could be employed and an example is schematically depicted in FIG. 7. An emitter 55, such as a piezoelectric crystal, is mounted in wall 58 and broadcasts a continuous sonic signal diagonally across conduit 56 to similar receiver 57. The change in frequency from what was emitted to what was received determines the flow velocity. These frequency changes may be employed for the accuracy checking test. If the flow of the media 61 is toward the emitter, that is, against the linear component of emitted signal 62, the frequency of the signal at the receiver decreases due to the Doppler effect. Greater velocity results in a lower frequency and lower fluid velocity against signal transmission direction results in a higher frequency. The Doppler effect can be employed to indicate increase or decrease in flow rate, and is particularly effective for accuracy verification purposes as follows.

For test purposes, the roles of the emitter and receiver are reversed or interchanged in the manner as described with respect to FIG. 1. The only difference is that the media flow is now with the linear component of the sonic signal, so the receiver senses a higher frequency than was emitted. With this reverse arrangement, with increased media velocity the frequency increases and with decreased media velocity the Doppler effect frequency decreases.

As before, the sensor and media characteristics are known and are stored in the flowmeter memory. The appropriate correlation is checked and the accuracy of the flowmeter is determined by checking that the sensors are providing substantially the same information as to flow velocity with either being the emitter or the receiver.

A variation on the emitter/receiver reversal-based accuracy test is to use two different frequencies and either switch or not switch emitter/receiver functions. This is analogous to employing different signal levels in the thermally-based flowmeters. The characteristics of the emitter/receiver pair are stored in memory at, for example, 100 kHz and at 200 kHz. Any appropriate frequencies may be employed. The emitter is stimulated to emit a 100 kHz signal and the mass flow rate is determined. Then the emitter is stimulated to emit a 200 kHz signal and the mass flow rate is again determined. If the thus determined rates are substantially equal, the flowmeter is functioning properly and is providing an accurate indication of flow rate. Again, the emitter characteristics for the different frequencies are stored in memory.

Another sonic system would employ the concept of phase shift. As with the Doppler system, when using a phase shift system the stimulation to the active, or emitter, sensor element is controlled by the signal conditioner and the signal processor. The phase shift sensed by the reference, or receiver, sensor element is indicative of the velocity of the media. An increase or decrease in that rate results in variations in the amount of phase shift of the received signal.

When the sensors are to be tested, the emitter and receiver functions are switched and the phase shift changes would also be reversed, as with the Doppler system.

Another alternative sensing system is an ultrasonic meter using a variable time of flight for a sonic pulse to propagate through the flowing medium. This would be calibrated by reversing the sonic signal so that the source becomes the receptor of the signal. The difference in transit time (or pulse repetition rate) provides an indication of flow rate. The same kind of correlation is accomplished as has been previously described. Alternatively, an additional source and receiver could be located near their counterparts. The switch could then connect them to the signal processor.

Figure 8A:
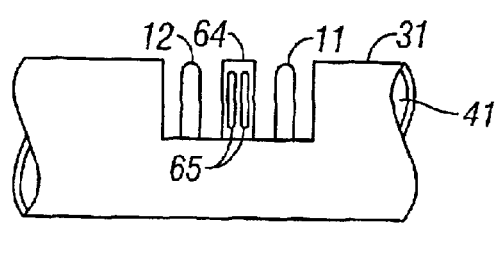
FIG. 8A is side view similar to FIG. 3, showing an alternative embodiment with cleaning jet in relation to the sensor elements.
Figure 8B:
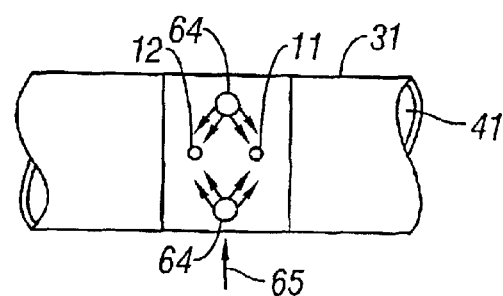
FIG. 8B is a top view of the embodiment of FIG. 8A.

If it is desired to check the accuracy of the thermal flowmeter at some time when there is no media flow, such as immediately before process commencement and after flowmeter installation, calibrated cleaning jets or nozzles directed at the sensor elements may be used. An exemplary embodiment of thermowells with cleaning jets is shown in FIG. 8. FIG. 8A is similar to FIG. 3, where mast 31 has central bore 41 and thermowells 11 and 12. Closed tube 64 is formed with slits 65 which emit gas at a predetermined velocity to impinge upon the sides of the thermowells. From the top view of FIG. 8B it can be seen how the gas jets are directed to the thermowells. The media flow is indicated by arrow 65. Only two cleaning jet tubes are shown, but there could be more if fly ash build-up is particularly prevalent. These jets are sometimes installed with the flowmeter, their purpose being to clean soot, fly ash, or other pollutants from the heat transfer surfaces of the sensing elements. They can be used in a normal manner on a periodic basis to clean the sensors, and could be employed as desired for accuracy test purposes. The cleaning jets could emit air or any appropriate gas, or even a liquid in appropriate circumstances.

The cleaning jets are calibrated to provide a known stimulation to the sensors. The sensor outputs would then be compared with the calibration data in memory to determine functioning accuracy. This method introduces an additional flow rate from the cleaning jets, which is of known value. The cleaning jets could be configured to have more than one flow rate. With the characteristics of the sensors stored in memory, testing can be accomplished by stimulating the active sensor at two or more different flow rates from the cleaning jet. An output comparison is made as discussed previously.

While the cleaning jet alternative is described above as being utilized for accuracy checking when there is no media flowing in the conduit, it could also be used during normal media flow, as added stimulation. Since this is a calibrated additional stimulation, the flowmeter electronics can take it into account and check its accuracy without switching sensor functions.

A vortex system could also be employed as a mass flow sensor and the principles of this invention are applicable to that type of sensor system. A vortex-based sensor can employ a strain gauge on or in a strut arranged across the flow stream. The frequency of motion of the strain gauge is proportional to the flow rate. Other vortex sensors such as temperature sensors are often employed.

Figure 9A:
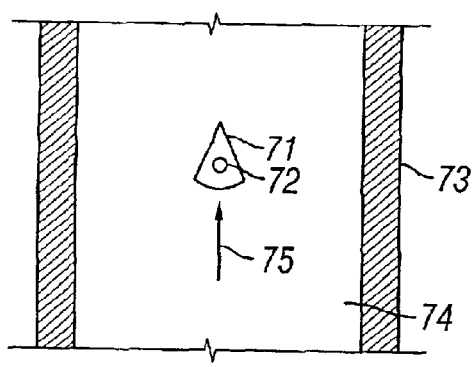

A vortex sensor may be a configured to present a different profile to the flowing media, as shown in FIG. 9. Strut 71 is shown in a first position in FIG. 9A, having strain gauge 72 mounted therein. Such strain gauges are known. The flow of the media in conduit 74, defined by wall 73, is represented by arrow 75. Strut 71 is shown end-on and would extend from an appropriate opening in wall 73 across the conduit a distance to be determined by the installer, given the diameter of the conduit, the type of media, and the typical flow rate range of the media flowing therein.

Figure 9B:
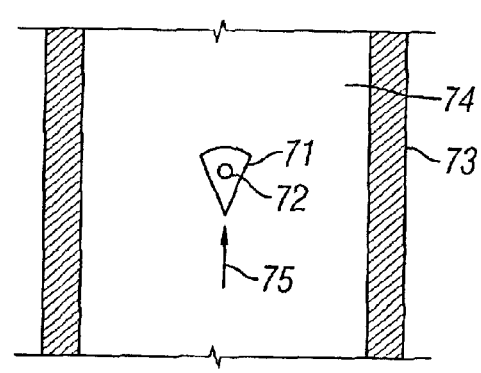

When an accuracy verification test is to be made, strut 71 can be rotated 180°, for example, as shown in FIG. 9B. The different shape will result in a different stress or frequency of motion detected by the strain gauge or other type of vortex sensor. Characteristic data for the strut in each attitude is stored in memory and the testing procedure is as previously described, where the flowmeter outputs are correlated to determine if there is any discrepancy in the alternative readings. In this embodiment the stimulation variation is the rotation of the vortex strut. Although a single vortex strut is shown, two struts in the same conduit or flow path may be used. One could be oriented as in FIG. 9A to the flow path and the other could be oriented as in FIG. 9B. The readings of each could be compared. Alternatively, for flowmeter validation purposes, the struts are each rotated 180° to present the opposite aspect to the direction of flow. Of course, the usual steps are taken at the outset to store the relevant function characteristics in memory for comparison purposes.

The cleaning jet embodiment described above could also be employed with the vortex meter wherein an added but known stimulation could be applied.

The media flow sensing elements could also be turbine-based, where a rotating element provides the flow rate information that the meter electronics converts to useful data. Turbine-type sensing elements can also be validated by employing the air or gas jets described above. The jets provide a predetermined gas flow against the turbine elements, thereby enabling the outputs of the turbine sensors to be correlated with their characteristic data in memory.

Orifice, pitot tube, and venturi sensors could likewise be stimulated by the above method for flow rate stimuli.

Figure 10:
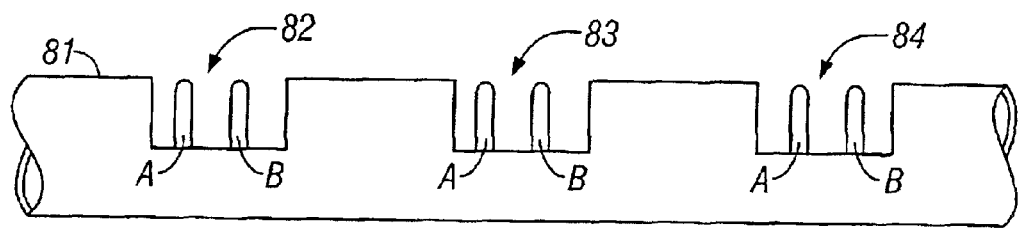
FIG. 10 shows several pairs of sensor elements on a mast to depict a system approach employing the principles of the invention.

A system approach to thermally-based flowmeter validation is exemplified by FIG. 10. Here mast 81 has several A-and-B pairs of sensors 82, 83, 84. Adjacent sensing elements can be employed to supply individual or averaged non-heated signals for use by a sensing element under test. For example to test active sensing element 83, stimulated or heated element 83A is coupled or compared with non-stimulated or non-heated element 82B to provide $\Delta R_1$. Then heated element 83A is compared with non-heated element 82A to provide $\Delta R_2$. All of the usual characteristic data is stored in memory, as before. Then a comparison is made between $\Delta R_1$ and $\Delta R_2$ to validate the proper operation of 83A, the active sensing element.

As an alternative means of validation:

$$\text{Heated } 83B - \frac{\text{non-heated } 82A + \text{non-heated } 84A}{2} = \Delta R_3$$

$$\text{Heated } 83A - \frac{\text{non-heated } 82A + \text{non-heated } 84A}{2} = \Delta R_4$$

Then $\Delta R_3$ and $\Delta R_4$ are compared to validate proper functioning of these elements. Of course, other combinations could be employed to test any of the elements on mast 81, such as comparing stimulated element 83 with the average of stimulated elements 82 and 84. It is possible that numerous elements such as 83 (16 elements, for example), may be employed, and element 83 may be compared with any combination of the various outputs. Again, variable but known stimulation levels could be applied as has been previously discussed.

It should be noted that electrical current, power or voltage applied to the thermally-based sensors produce heat. But sensors of other types have been discussed so the term "stimulation" is used with reference to any of the active sensors disclosed herein. Thus, the sonic or ultrasonic sensors can be stimulated by some type of signal to emit and receive predetermined sonic signals. The cleaning jet alternative is another type of stimulation used to test the sensors for accuracy. Note that some sources of stimulation of the sensors are internally generated, that is, an RTD is heated by electrical current through the resistive element or a separate thermally connected source. Others are externally applied, as the cleaning jet system. In the sonic systems the emitter and receiver generate or receive signals having different frequencies depending on the characteristics of the stimulation signal from the signal conditioner and the signal processor. There may be no difference in power levels applied or heat dissipated in some of the alternative systems.

It is now evident that the flowmeter accuracy validation systems of the various embodiments of this invention are convenient to use, very accurate, and are valid "wet" tests. There is no need for additional elements to be temporarily connected into the flowmeter for test purposes, nor does it require any element of disassembly. Simply pre-calibrating the sensors so their calibration characteristics can be stored in memory in the flowmeter electronics, and providing switching, reversing or alternative signals where appropriate, and comparing the sensor outputs in the two test modes is all that is needed. These functions speed up and simplify in-situ testing of flowmeters, with verifiable accuracy.

The term "periodic" has been used in reference to performing accuracy verification tests for a flowmeter. This merely means that tests are performed from time to time and may be on a regular timed basis, or it may be on an irregular basis as determined by the operator and controlled by the stored program or by operation of the entry/keypad.

Figure 5:
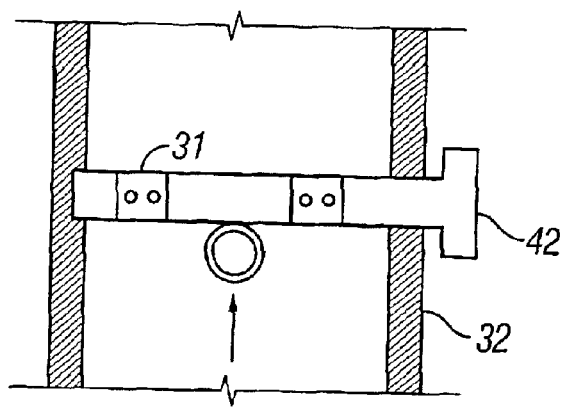
FIG. 5 is an elevational view showing the sensors of FIG. 3 in a typical operational environment.
Figure 6:
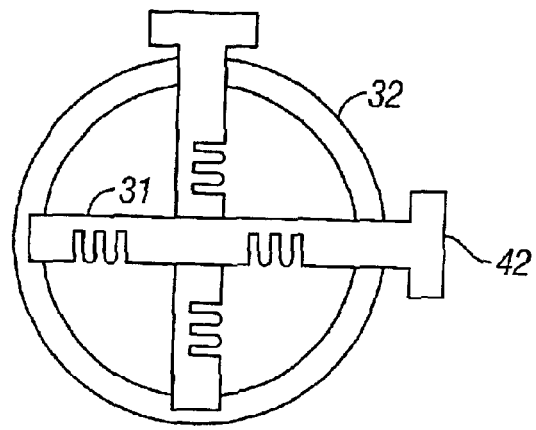
FIG. 6 is a top plan view of the installation of FIG. 5, in an exemplary embodiment of the invention.

The sensor or sensors have been shown as in relatively close proximity to the flowmeter controls and electronics in housing 42 (FIGS. 5 and 6). It is equally possible that any or all elements of the flowmeter can be remotely located with respect to the conduit and the sensors or other signal-producing elements which have an active relationship with the flowing media. Signals can be connected by wires or may be wirelessly coupled. Any kind of power supply can be used to stimulate the active sensor and the power supply could be local or remote.

The invention is also useful as a diagnostic tool for a flowmeter. The time rate of change of the flowmeter, or its transient response, can be employed to determine the extent of fouling of the thermowells or other types of sensing elements which are in the flow field. For thermal dispersion sensors, it is not uncommon for the thermally sensitive heat transfer surfaces to become coated with flying particles (usually some form of fly ash). When this occurs it can be detected by its transient response or the rate of change as the sensing element is heated, or as the temperature reduces due to thermal dispersion by the flowing media. When there is a build-up of fouling material the $\Delta T$ or $\Delta R$ decays more slowly and rises more quickly than when the sensors are not coated.

In some contemporary thermal dispersion instruments, three sensor elements may be used (one to accurately measure temperature), with various means of stimulation, and may be substantially different in electrical qualities, such as electrical resistance. The three elements may be stimulated in any way or in any combination and at various time rates of change of stimulation and the time rate of change of signal may be used to determine mass flow rate or time rate of change of mass flow rate. Two or more such sensor elements may be connected in such a way that they act as a single sensor and the characteristics of each individual sensor cannot be determined. Any of the described alternative methods to perform validation checks may be employed for such a sensor configuration.

It can be seen that these operational tests do not require removal of the flowmeter, nor do they require any additional or substitutional elements to be temporarily connected to the flowmeter in order to perform the test. The electronics of the flowmeter itself have some extra elements, but they function within the operation of the meter and are not physically substituted when tests are made. Even greater assurance of validity can be obtained by employing any of the schemes above or in any combination thereof.

What is claimed is:

1. A method for testing the accuracy of a flowmeter having at least two sensing elements arranged to detect fluid flow rate in a flow field, the method comprising:

determining the calibration data of each sensing element;

storing the calibration data in memory in the flowmeter;

applying a first predetermined stimulation to a first sensing element to make it an active sensing element;

applying a second predetermined stimulation different from the first stimulation to a second sensing element so that the second sensing element functions as a reference sensing element;

measuring the output of the first sensing element measuring the output of the second sensing element;

comparing the outputs of the first and second sensing elements to determine a first fluid flow rate past the sensing elements in the flow field; then interchanging the functions of the first and second sensing elements;

applying the first predetermined stimulation to the second sensing element;

applying the second predetermined stimulation to the first sensing element;

measuring the output of the second sensing element;

measuring the output of the first sensing element; then comparing the outputs of the second sensing element and the first sensing element to determine a second fluid flow rate past the sensing elements in the flow field; and then comparing the thus determined first and second fluid flow rates.

2. The method recited in claim 1, and further comprising determining the correlation between the first and second fluid flow rates in relation to the calibration data in memory and thereby validating the accuracy of the flowmeter.

3. The method recited in claim 1, wherein the flowmeter is a thermal dispersion flowmeter and the sensing element outputs are based on heat dissipation.

4. The method recited in claim 3, wherein the sensing elements are chosen from the group consisting of resistance temperature detectors (RTDs), thermistors, thermopiles, semiconductor junctions, thermocouples, transistors, and diodes.

5. The method recited in claim 3, wherein the first and second sensing elements are stimulated by means of a predetermined stimulation applied thereto selected from the group consisting of current, voltage, power and differential temperature.

6. The method recited in claim 1, wherein the first and second sensing elements are stimulated by means of a predetermined sonic signal applied thereto.

7. The method recited in claim 1, wherein the first and second sensing elements are stimulated by applying a predetermined fluid flow thereto.

8. The method recited in claim 7, wherein the predetermined fluid flow is provided by jets or nozzles.

9. The method recited in claim 1, wherein one of the first and second sensing elements comprises at least two sensing elements so connected as to act as a single sensor.

10. The method recited in claim 1, wherein the first and second sensing elements are vortex sensing elements.

11. The method recited in claim 6, wherein time of flight is the principle employed for measuring flow rate.

12. The method recited in claim 6, wherein Doppler effect is the principle employed for measuring flow rate.

13. The method recited in claim 6, wherein relative signal phase is the principle employed for measuring flow rate.

14. The method recited in claim 1, wherein the first and second sensing elements are substantially functionally identical.

15. The method recited in claim 2, and further comprising providing an output signal representative of the accuracy of the flowmeter.

16. The method recited in claim 1, wherein the sensing elements of the flowmeter are the type chosen from the group consisting of thermal dispersion, sonic, vortex, magnetic, turbine, orifice, venturi, pitot tube, positive displacement, and coriolis.

17. The method recited in claim 1, wherein the flowmeter has a plurality of sensing elements, the second sensing element comprising at least two sensing elements, each being stimulated by the second predetermined stimulation, the method further comprising:

comparing the output of the first sensing element with respect to the output of one second sensing element;

comparing the output of the first sensing element with respect to the output of the other second sensing element; and correlating the thus compared outputs to validate the accuracy of the flowmeter.

18. The method recited in claim 17, wherein the sensing elements are arranged in spaced pairs in the flow field and each single sensing element being tested is compared with two other sensing elements in the flow field, said two other sensing elements being not in a pair with the sensing element being tested.

19. The method recited in claim 17, wherein the sensing elements are arranged in spaced pairs in the flow field and the output of each single sensing element of a pair of sensing elements being tested is compared with the average of the outputs of two other single sensing elements, each in a different pair of sensing elements.

20. A method for testing the accuracy of a flowmeter having at least two sensing elements arranged to detect fluid flow rate in a flow field, the method comprising:

determining the calibration data of each sensing element;

storing the calibration data in memory in the flowmeter;

applying a first predetermined stimulation to a first sensing element to make it an active sensing element;

applying a second predetermined stimulation different from the first stimulation to a second sensing element so that the second sensing element functions as a reference sensing element;

measuring the output of the first sensing element measuring the output of the second sensing element;

comparing the outputs of the first and second sensing elements to determine a first fluid flow rate past the sensing elements in the flow field; then applying a third predetermined stimulation to the first sensing element different from the first and second predetermined stimulations to make it an active sensing element at a different level of stimulation;

applying the second predetermined stimulation to the second sensing element;

measuring the output of the first sensing element at the third predetermined stimulation;

measuring the output of the second sensing element; then comparing the outputs of the first sensing element and the second sensing element to determine a second fluid flow rate past the sensing elements in the flow field; and then comparing the thus determined first and second fluid flow rates.

21. The method recited in claim 20, and further comprising determining the correlation between the first and second fluid flow rates in relation to the calibration data in memory and thereby validating the accuracy of the flowmeter.

22. The method recited in claim 20, wherein the flowmeter is a thermal dispersion flowmeter and the sensing element outputs are based on heat dissipation.

23. The method recited in claim 22, wherein the sensing elements are chosen from the group consisting of resistance temperature detectors (RTDs), thermistors, thermopiles, semiconductor junctions, thermocouples, transistors, and diodes.

24. The method recited in claim 22, wherein the first and second sensing elements are stimulated by means of a predetermined stimulation applied thereto selected from the group consisting of current, voltage, power and differential temperature.

25. The method recited in claim 20, wherein the first and second sensing elements are stimulated by means of a predetermined sonic signal applied thereto.

26. The method recited in claim 20, wherein the first and second sensing elements are stimulated by applying a predetermined fluid flow thereto.

27. The method recited in claim 26, wherein the predetermined fluid flow is provided by jets or nozzles.

28. The method recited in claim 20, wherein one of the first and second sensing elements comprises at least two sensing elements so connected as to act as a single sensor.

29. The method recited in claim 20, wherein the first and second sensing elements are vortex sensing elements.

30. The method recited in claim 25, wherein time of flight is the principle employed for measuring flow rate.

31. The method recited in claim 25, wherein Doppler effect is the principle employed for measuring flow rate.

32. The method recited in claim 25, wherein relative signal phase is the principle employed for measuring flow rate.

33. The method recited in claim 20, wherein the first and second sensing elements are substantially functionally identical.

34. The method recited in claim 21, and further comprising providing an output signal representative of the accuracy of the flowmeter.

35. The method recited in claim 20, wherein the sensing elements of the flowmeter are the type chosen from the group consisting of thermal dispersion, sonic, vortex, magnetic, turbine, orifice, venturi, pitot tube, positive displacement, and coriolis.

36. A method for testing the accuracy of a flowmeter arranged for detecting fluid flow rate in a flow field, the flowmeter having at least one sensing element, the method comprising:
preparing a first set of calibration data for the sensing element at a first applied stimulation level;
preparing a second set of calibration data for the sensing element at a second applied stimulation level different from the first applied stimulation level;
storing the first and second sets of calibration data in memory;
mounting the sensing element in the flow field; then
measuring the output of the sensing element when at a reference third applied stimulation level;
stimulating the sensing element by applying the first level of stimulation thereto;
measuring the output of the sensing element when at the first applied stimulation level;
comparing the output of the sensing element stimulated by the first level of stimulation to the output of the sensor at the third stimulation level to determine a first fluid flow rate past the sensing element in the flow field; then
again measuring the output of the sensing element when at a reference third applied stimulation level;
stimulating the sensing element by applying the second level of stimulation thereto;
measuring the output of the sensing element when stimulated by the second level of stimulation; and then
comparing the output of the sensing element stimulated by the second level of stimulation to the output of the sensor at the third stimulation to determine a second fluid flow rate past the sensing element in the flow field; and then
comparing the thus determined first and second fluid flow rates.

37. The method recited in claim 36, and further comprising determining the correlation between the first and second fluid flow rates in relation to the calibration data in memory and thereby validating the accuracy of the flowmeter.

38. The method recited in claim 36, wherein the flowmeter is a thermal dispersion flowmeter and the sensing element outputs are based on heat dissipation.

39. The method recited in claim 38, wherein the sensing elements are chosen from the group consisting of resistance temperature detectors (RTDs), thermistors, thermopiles, semiconductor junctions, thermocouples, transistors, and diodes.

40. The method recited in claim 38, wherein the sensing element is stimulated by means of predetermined first and second levels of a stimulation applied thereto, the stimulation being selected from the group consisting of current, voltage and power.

41. The method recited in claim 36, wherein the sensing element is stimulated by means of a predetermined first and second sonic signal applied thereto.

42. The method recited in claim 36, wherein the sensing element is stimulated by a predetermined first and second fluid flow thereto.

43. The method recited in claim 42, wherein the predetermined fluid flow is provided by jets or nozzles.

44. The method recited in claim 36, wherein the sensing element comprises at least two sensing elements so connected as to act as a single sensor.

45. The method recited in claim 36, wherein the sensing element is a vortex sensing element.

46. The method recited in claim 37, and further comprising providing an output signal representative of the accuracy of the flowmeter.

47. The method recited in claim 36, wherein the sensing element of the flowmeter is of the type chosen from the group consisting of thermal dispersion, sonic, vortex, magnetic, turbine, orifice, venturi, pitot tube, positive displacement, and coriolis.

48. An apparatus to validate the accuracy of a flowmeter, which flowmeter is arranged to detect fluid flow rate in a flow field, the apparatus comprising:
at least two sensing elements mounted in the flow field;
a source for selectively supplying stimulation to said sensing elements;
a switch for selectively coupling said stimulation source to said sensing elements;
a memory in which calibration characteristics for each said sensing element is stored;
means for measuring the output of each said sensing element;
a first comparator for comparing the transient and steady-state outputs of each sensing element, both when transiently and steady-state stimulated and when relatively unstimulated, to the respective calibration characteristics in memory;
means for determining fluid flow rate past each sensing element in the flow field when one sensor is stimulated; and
a second comparator for comparing the thus determined fluid flow rates and the transient output of the stimulated sensing element.

49. The apparatus recited in claim 48, and further comprising a correlator for verifying the accuracy of the flowmeter based on the flow rates indicated by each said sensing element.

50. The apparatus recited in claim 48, wherein said sensing elements are selected from the group consisting of resistance temperature detectors (RTDs), thermistors, thermopiles, semiconductor junctions, thermocouples, transistors, and diodes.

51. The apparatus recited in claim 48, wherein said sensing elements are thermally-based devices and said stimulation source is adapted to provide stimulation internally to said sensing elements.

52. The apparatus recited in claim 48, wherein said sensing elements are sonic and said stimulation source is adapted to provide stimulation internally to said sensing elements.

53. The apparatus recited in claim 52, wherein said sensing elements are responsive to time of flight of the sonic signal.

54. The apparatus recited in claim 52, wherein said sensing elements are responsive to Doppler effect as the flowing fluid affects the sonic signal.

55. The apparatus recited in claim 52, wherein said sensing elements are responsive to relative signal phase as the flowing fluid affects the sonic signal.

56. The apparatus recited in claim 48, and further comprising means for providing an output signal representing the accuracy of the flowmeter.

57. The apparatus recited in claim 50, and further comprising a fluid jet in operative relationship to each said sensing element, said fluid jet being calibrated to provide a predetermined fluid flow as an external stimulation to said sensing element, the fluid flow from said fluid jet being controlled by said stimulation source and said switch.

58. The apparatus recited in claim 48, wherein said switch is a cross-connect circuit.

59. The apparatus recited in claim 48, wherein said sensing elements are substantially functionally identical.

60. The apparatus recited in claim 48, wherein said sensing elements are vortex sensing elements.

61. The apparatus recited in claim 48, wherein said sensing elements comprise a single sensing element made up of at least two sensing elements so connected as to act as a single sensor.

62. The apparatus recited in claim 48, wherein;
said at least two sensing elements comprise a plurality of sensing elements;
said comparator being configured to compare the outputs of a stimulated said sensing element being tested with at least two relatively unstimulated sensing elements.

63. The apparatus recited in claim 62, wherein said sensing elements are arranged in spaced pairs in the flow field and the output of said stimulated sensing element is compared with the outputs of two other sensing elements in the flow field, said two other sensing elements being not in a pair with said stimulated sensing element.

64. The apparatus recited in claim 62, wherein said sensing elements are arranged in spaced pairs in the flow field and the output of each single said sensing element of a pair of said sensing elements is compared with the average of the outputs of two other said single sensing elements, each in a different pair of said sensing elements.

65. The apparatus recited in claim 48, wherein at least one of said sensing elements is externally stimulated by a predetermined first and second fluid flow thereto.

66. An apparatus to validate the accuracy of a flowmeter, which flowmeter is arranged to detect fluid flow rate in a flow field, the apparatus comprising:
at least one sensing element mounted in the flow field;
a stimulation supply configured for selectively supplying stimulation to said sensing element at predetermined different stimulation levels;
a switch for selectively coupling said stimulation supply at discrete stimulation levels to said sensing element;
a memory in which is stored calibration characteristics of said sensing element for each stimulation level;
means for measuring the output of said sensing element at any time, either transiently or during steady state;
a first comparator for comparing the output of said sensing element, when it has been or is being stimulated by the different levels of applied stimulation, to the respective calibration characteristics in memory;
means for determining fluid flow rate past said sensor for each level of applied stimulation; and
a second comparator for comparing the thus determined fluid flow rate.

67. The apparatus recited in claim 66, and further comprising a correlator to verify the accuracy of said flowmeter based of the fluid flow rates determined by applying different stimulation levels to said sensing element.

68. The apparatus recited in claim 66, wherein said sensing element is selected from the group consisting of resistance temperature detectors (RTDs), thermistors, thermopiles, semiconductor junctions, thermocouples, transistors, and diodes.

69. The apparatus recited in claim 66, wherein said sensing element is a thermally-based device and said stimulation source is adapted to provide stimulation internally to said sensing element.

70. The apparatus recited in claim 67, and further comprising a fluid jet in operative relationship to said sensing element, said fluid jet being calibrated to provide a predetermined fluid flow as an external stimulation to said sensing element, the fluid flow from said fluid jet being controlled by said stimulation source and said switch.

71. The apparatus recited in claim 66, wherein said sensing element comprises a sonic emitter and a sonic receptor.

72. The apparatus recited in claim 66, and further comprising means for providing an output signal representing the accuracy of the flowmeter.

73. The apparatus recited in claim 66, wherein said sensing element is externally stimulated by a predetermined first and second fluid flow thereto.

74. The apparatus recited in claim 66, wherein said at least one sensing element comprises at least two sensing elements so connected as to act as a single sensor.

75. The apparatus recited in claim 66, wherein said sensing element comprises a vortex sensing element.

76. An apparatus to validate the accuracy of a flowmeter, which flowmeter is arranged to detect fluid flow rate in a flow field, the apparatus comprising:
at least two sensing elements mounted in the flow field;
a source for selectively supplying predetermined different levels of stimulation to said sensing elements;
a memory in which calibration characteristics for each said sensing element is stored;
means for measuring the output of each said sensing element at predetermined different levels of stimulation;
a first comparator for comparing the outputs of each sensing element, both when transiently and steady-state stimulated and when relatively unstimulated, to the respective calibration characteristics in memory;
means for determining fluid flow rate past each sensing element in the flow field when one sensor is stimulated; and
a second comparator for comparing the thus determined fluid flow rates.

77. The apparatus recited in claim 76, and further comprising a correlator for verifying the accuracy of the flowmeter based on the flow rates indicated by each said sensing element.

78. The apparatus recited in claim 76, wherein said sensing elements are selected from the group consisting of resistance temperature detectors (RTDs), thermistors, thermopiles, semiconductor junctions, thermocouples, transistors, and diodes.

79. The apparatus recited in claim 76, wherein said sensing elements are thermally-based devices and said stimulation source is adapted to provide stimulation internally to said sensing elements.

80. The apparatus recited in claim 76, wherein said sensing elements are sonic and said stimulation source is adapted to provide stimulation internally to said sensing elements.

81. The apparatus recited in claim 80, wherein said sensing elements are responsive to time of flight of the sonic signal.

82. The apparatus recited in claim 80, wherein said sensing elements are responsive to Doppler effect as the flowing fluid affects the sonic signal.

83. The apparatus recited in claim 80, wherein said sensing elements are responsive to relative signal phase as the flowing fluid affects the sonic signal.

84. The apparatus recited in claim 76, and further comprising means for providing an output signal representing the accuracy of the flowmeter.

85. The apparatus recited in claim 78, and further comprising a fluid jet in operative relationship to each said sensing element, said fluid jet being calibrated to provide a predetermined fluid flow as an external stimulation to said sensing element, the fluid flow from said fluid jet being controlled by said stimulation source and said switch.

86. The apparatus recited in claim 76, and further comprising a switch for selectively coupling said stimulation source to said sensing elements, wherein said switch is a cross-connect circuit.

87. The apparatus recited in claim 76, wherein said sensing elements are substantially functionally identical.

88. The apparatus recited in claim 76, wherein said sensing elements are vortex sensing elements.

89. The apparatus recited in claim 76, wherein said sensing elements comprise a single sensing element made up of at least two sensing elements so connected as to act as a single sensor.

90. The apparatus recited in claim 76, wherein;
said at least two sensing elements comprise a plurality of sensing elements;
said comparator being configured to compare the outputs of a stimulated said sensing element being tested with at least two relatively unstimulated sensing elements.

91. The apparatus recited in claim 90, wherein said sensing elements are arranged in spaced pairs in the flow field and the output of said stimulated sensing element is compared with the outputs of two other sensing elements in the flow field, said two other sensing elements being not in a pair with said stimulated sensing element.

92. The apparatus recited in claim 90, wherein said sensing elements are arranged in spaced pairs in the flow field and the output of each single said sensing element of a pair of said sensing elements is compared with the average of the outputs of two other said single sensing elements, each in a different pair of said sensing elements.

93. The apparatus recited in claim 76, wherein at least one of said sensing elements is externally stimulated by a predetermined first and second fluid flow thereto.

* * * * *